H. H. WILLIAMS.
ACCOUNT CARD FOR INSURANCE COMPANIES AND THE LIKE.
APPLICATION FILED MAY 18, 1921.
1,435,436.                                                    Patented Nov. 14, 1922.
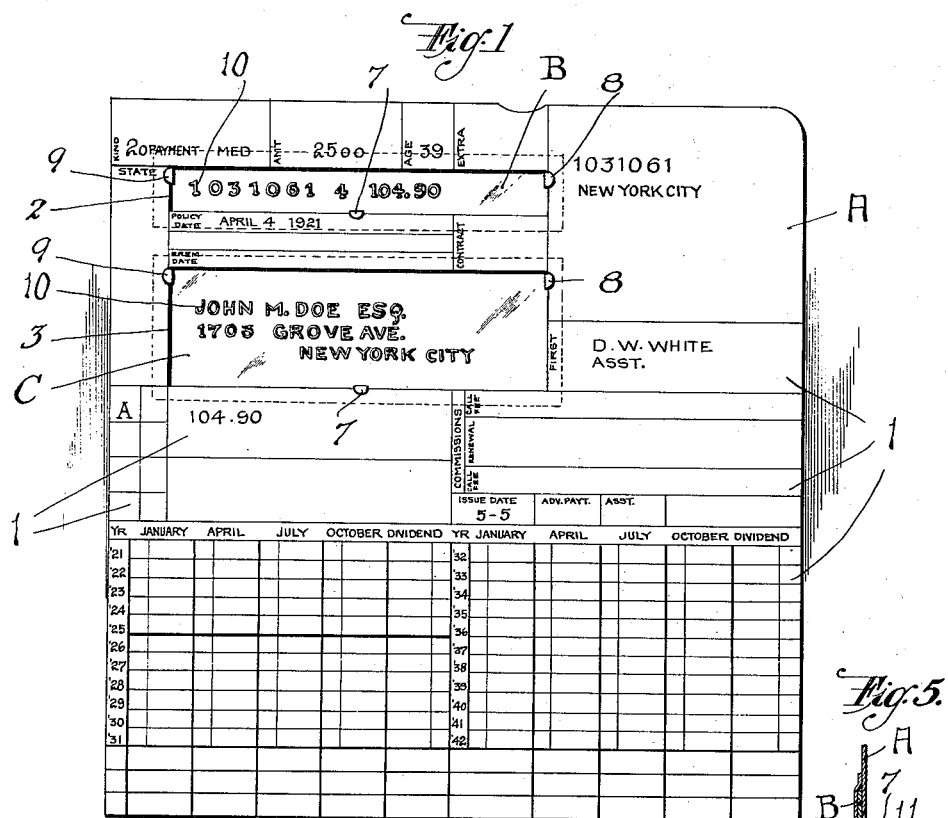
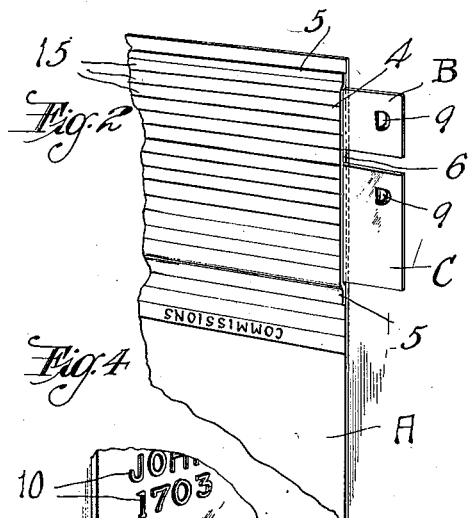
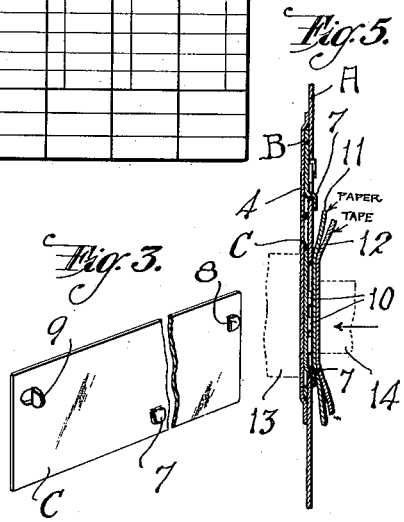
INVENTOR
HERBERT H. WILLIAMS
BY
Everett & Rook,
ATTORNEYS.

Patented Nov. 14, 1922.

1,435,436

UNITED STATES PATENT OFFICE.

HERBERT H. WILLIAMS, OF EAST ORANGE, NEW JERSEY.

ACCOUNT CARD FOR INSURANCE COMPANIES AND THE LIKE.

Application filed May 18, 1921. Serial No. 470,519.

*To all whom it may concern:*

Be it known that I, HERBERT H. WILLIAMS, a citizen of the United States, and a resident of East Orange, in the county of Essex and State of New Jersey, have invented certain Improvements in Account Cards for Insurance Companies and the like, of which the following is a specification.

At the present time it is customary for large insurance companies to keep account of the payment of premiums on their policies upon cards, one for each policy and having at an upper part of itself the name, address, and so forth, of the policy holder, said cards being filed vertically according to any well-known system. When notices, receipts and the like, are sent out to policy holders the same must be addressed by typewriter from the account card, or if it is desired to avoid such typewriting, a separate file of printing plates for an addressing machine must be kept. In the latter case, whenever a policy holder changes his address it is necessary to make the corresponding change in both files, the file of account cards and the file of printing plates, and remembering that these files contain millions of names such changes involve much labor to say nothing of liability of error in not changing both card and plate exactly the same. Also the expense of keeping two separate files, because of filing space and equipment required, is so great as to over-balance the advantages of using an addressing machine, in the opinion of many.

The objects of this invention are to provide an account card for insurance companies and the like which shall itself carry the addressing machine printing plate and thus avoid the necessity for two separate files and all the disadvantages of the same pointed out above; to thus provide an account card from which the name and address of each policy holder or other data required for notices, receipts and so forth, can be printed directly; to have only one record of such data and thus only one place to make changes when revision is necessary; to provide an account card of the character described including a body portion to receive a permanent record and a printing member removably mounted on said body portion so that the printing member can be bodily removed from and replaced in the body portion without in any way injuring or otherwise physically affecting either said body portion or said printing member; to thus save filing space and equipment and reduce the amount of labor and liability of error, and to obtain other advantages and results as may be brought out by the following description.

Referring to the accompanying drawings, in which like numerals of reference indicate the same parts throughout the several views,
Figure 1 is a plan view of the face of an account card constructed in accordance with my invention, showing two printing plates attached thereto;

Figure 2 is a fragmentary perspective view of the back of the card, showing the printing plates partially removed therefrom;

Figure 3 is a detached perspective view of one of the printing plates before the type is formed thereon;

Figure 4 is a fragmentary perspective view of a printing plate with the type formed thereon, and Figure 5 is a fragmentary transverse sectional view through the card and the printing plates showing the preferred method of printing from the printing plates.

In the embodiment of my invention shown in the drawings, the reference character A designates an account card, preferably formed of cardboard or other fibrous material, for use in insurance offices, the said card being provided with a plurality of spaces 1 to receive the desired entries of payments, etc. At those parts of the card where the name and address of the policy holder and the number, etc., of the policy have heretofore been printed directly on the card, I show printing plates B and C bearing such data, preferably removable from the card. These may be mounted in any suitable manner, but for illustration I have shown openings 2 and 3 in the card to expose the printing plates which are carried in a pocket or slideway 4 at the back of the card and formed by securing a strip of paper or the like at its edges to the back of the card, as indicated at 5, the main portion of the strip being spaced from the back of the card and providing an opening 6 at one edge of the card for permitting the placing of the printing plates in the pocket 4.

When it is desired to print notices, receipts, or the like, my improved card carrying the printing plates B and C is run through the addressing machine, without detaching said printing plates from the card, and the card afterwards returned to the file. In this way the card serves as a holder or frame for the printing plate, and the printing plate takes the place of the data which is usually written directly upon the card, so that two separate files, one for a card and the other for printing plates are no longer necessary and the single file contains everything. This greatly simplifies filing and avoids duplication of matter in two separate files.

In the present instance I have shown two printing plates, but it will be understood that one, two or more of said plates can be utilized as desired. The plates are substantially identical in construction except in size and the printing thereon, each of said plates comprising a substantially rectangular sheet of metal slightly larger than the corresponding opening 2 or 3 in the card A and having adjacent the lower edge thereof and midway of the plate a lug 7 which can be conveniently struck up from the plate. Each plate is also formed adjacent its ends and the upper edge thereof with similar lugs 8 and 9, the lugs 7, 8 and 9 being so positioned on the plate that the lug 7 engages and overlies the bottom edge of the opening in the card and the lugs 8 and 9 overlie the respective end edges of the opening and abut against the upper edge of said opening, as clearly shown in Figure 1. In applying either printing plate B or C to the card A, the said plate is slipped into the opening 6 of the pocket 4, as shown in Figure 2, with the lugs 7, 8 and 9 thereon in the positions indicated in Figure 3, the lug 9 which is to be positioned adjacent the outer edge of the card projecting at substantially right angles to the plate. The plate is pushed into the pocket 4 until the lug 8 engages the innermost end edge of the opening and, the lug 7 being brought into position overlapping the lower edge of the opening, the lug 9 is bent down over the outermost end edge of the opening, as shown in Figure 1.

The lugs 7, 8 and 9 thus firmly position the plate with respect to the card and the opening therein, and yet when it is desired to change a printing plate it can be done by bending up the lug 9 to its original position and removing the plate from the opening 2 or 3. When the printing plate has been corrected and returned to its place, the account card is by that same act corrected also, and without possibility of variance from the printing plate. Much labor is thus saved and great accuracy secured.

Preferably, the type and data 10 on the printing plates is raised in positive formation instead of negative, this being done by pressing or stamping the letters outwardly toward the face of the printing plates in the usual manner of embossing. This enables the data on the plate to be easily read from the face of the card so that the type serves both as a part of the record and for printing. Then in printing, the paper 11 to be printed, (see Figure 5), is laid on the card with its surface to receive the impression away from the printing plates B and C and carbon paper, inked ribbon, or the like, 12, is arranged over the face of the paper. Then when pressure is applied in any suitable manner, as by cooperating elements 13 and 14 of a printing machine engaging the back of the card A and the exposed side of the inked ribbon or the like 12, as clearly shown in Figure 5 of the drawings, the matter on the plates B and C will be printed on the paper so as to read properly and be clearly legible. It will be noted that the formation of the pocket 4 on the back of the card need not interfere with the keeping of records or data thereon, where such is desirable, since the outer surface of the paper strip forming the pocket can be divided into suitable spaces 15 the same as the card would be if the pocket and printing plates were not applied thereto.

While I have shown and described one possible embodiment of my invention, it will be understood that this is only for the purpose of illustrating the principles thereof, and that many modifications and changes can be made in the detail construction of the card and printing plates without departing from the spirit and scope of the invention; therefore I do not wish to be understood as restricting myself except as required by the following claims when construed in the light of the prior art.

Having thus described the invention, what I claim is:

1. An account card including a body portion to receive a permanent record of an account, and a printing member removably mounted on said body portion and adapted to receive data relating to said permanent record, whereby said printing member is adapted to be bodily removed from and replaced in said body portion without physically affecting either of said parts.

2. An account card including a sheet of fibrous material adapted to receive a permanent record, a metallic printing plate having raised printing characters thereon constituting data relating to said permanent record, and means for removably mounting said plate on said sheet of material, whereby said printing member is adapted to be bodily removed from and replaced in said body portion without physically affecting either of said parts.

3. An account card including a sheet of fibrous material adapted to receive a permanent record, a metallic printing plate adapted to receive data relating to said permanent record, and means for mounting said printing plate in said sheet of fibrous material whereby said sheet serves both as a record and a holding frame for said printing plate when used for printing.

4. An account card including a body to receive a record of an account on both sides thereof, and having a recess in one side thereof, and a printing plate mounted in said recess bearing a portion of the record of said account and having the printing side thereof exposed through said recess.

5. An account card including a body to receive a record of an account on both sides thereof, and having an opening therein, a pocket formed on one side of said card and closing said opening, and a printing plate bearing a portion of the record of said account mounted in said pocket with its printing side exposed through said opening.

6. An account card including a body to receive a record of an account on both sides thereof, and having an opening therein, a pocket formed on one side of said card and closing said opening, whereby the space occupied by said pocket may be utilized to receive a portion of said record, said pocket opening at the edge of said body to receive a printing plate, and a printing plate mounted in said pocket and exposed at one side of the card through said opening.

7. A mount for a printing plate having an opening and a printing plate having lugs for engaging the edges of said opening and positioning the plate therein.

8. A mount for a printing plate including a body portion having an opening, a pocket at the back of the body portion, and a printing plate in said pocket having lugs engaging the edges of the opening to position the plate.

9. A mount for a printing plate having an opening with an angle in it, and a printing plate having a lug adapted to engage the edge of the opening at said angle and thus hold the plate from movement in its plane in two directions.

10. A mount for a printing plate having an elongated four-sided opening and a printing plate having lugs engaging the edge of said opening, two of said lugs being at corresponding ends of the opposite short sides and the third midway of the opposite long side.

11. A filing card having upon a portion of itself raised characters in positive formation instead of negative and adapted both for record purposes and for printing.

12. A filing card having removably mounted upon itself a printing plate with raised characters in positive formation instead of negative.

13. A printing plate having raised characters in positive formation instead of negative, whereby it is adapted for both record purposes and for printing.

HERBERT H. WILLIAMS.